United States Patent [19]

Durham et al.

[11] Patent Number: 4,460,292

[45] Date of Patent: Jul. 17, 1984

[54] PROCESS FOR CONTAINMENT OF LIQUIDS AS SOLIDS OR SEMISOLIDS

[75] Inventors: Robert L. Durham; Carl R. Henderson, both of Houston; Richard C. Allison, II, LaPorte, all of Tex.

[73] Assignee: Agritec, Inc., Houston, Tex.

[21] Appl. No.: 398,503

[22] Filed: Jul. 15, 1982

[51] Int. Cl.³ .................... C02C 1/68; E21B 21/06
[52] U.S. Cl. .................... 405/129; 175/66; 405/128
[58] Field of Search .......... 106/98, 900; 166/283, 166/293; 175/65, 66; 405/128, 129; 501/133, 154, 155

[56] References Cited

U.S. PATENT DOCUMENTS

| | | | |
|---|---|---|---|
| 1,363,879 | 12/1920 | Junghandel | 106/98 |
| 2,720,462 | 10/1965 | Jones | 501/133 X |
| 3,168,139 | 2/1965 | Kennedy et al. | 166/293 X |
| 3,859,799 | 1/1975 | Jaco, Jr. | 405/128 |
| 3,980,558 | 9/1976 | Thompson | 405/128 X |
| 4,105,459 | 8/1978 | Mehta | 106/98 |
| 4,142,912 | 3/1979 | Young | 405/129 |
| 4,176,720 | 12/1979 | Wilson | 175/66 X |
| 4,238,374 | 12/1980 | Durham et al. | 47/41.12 X |
| 4,258,790 | 3/1981 | Hale | 166/283 X |
| 4,338,134 | 7/1982 | Münster | 106/900 X |

FOREIGN PATENT DOCUMENTS

WO82/00998  4/1982  PCT Int'l Appl. ............ 106/900

*Primary Examiner*—George A. Suchfield
*Attorney, Agent, or Firm*—Fulbright & Jaworski

[57] ABSTRACT

Disclosed is the containment or controlling of waste and hazardous liquids, drilling muds and chemicals in a semi-solid or solid form for removal, transportation and disposal or otherwise handling thereby avoiding the problems and reducing the expense in removing, transporting, disposing or otherwise handling them in liquid form.

28 Claims, No Drawings

PROCESS FOR CONTAINMENT OF LIQUIDS AS SOLIDS OR SEMISOLIDS

FIELD OF THE INVENTION

The present invention is in the field of containment or controlling of waste or hazardous liquids, drilling muds or chemicals for handling, transporting, disposal and other purposes.

BACKGROUND OF THE INVENTION

There is a tremendous problem and expense in the disposal of liquid wastes, particularly hazardous wastes, in landfills. The problems with liquids in landfills are twofold: leaching and subsidence. Chemicals will eventually leak out of corroding containers or open pits, mixing with water and other chemicals. The greater the liquid level in the container or pit, the faster contaminants will be driven through, over or around a landfill into the environment.

With buried wastes subsidence is caused when barrels or other containers corrode and crush or solidifying agents do not provide adequate support, causing the cap of soil to crack and collapse or to admit rainwater allowing for erosion and exacerbating leachate problems.

In order to overcome these problems, government regulations now provide that there can be no free-standing liquid in drums or containers in which hazardous wastes are buried. In general, governmental agencies allow about 5% of a container's contents to be free-standing liquid.

It thus is necessary to add various materials to the waste to solidify it prior to burial or to the barrel or container in which the liquid waste is to be buried to meet these regulations. Presently, sand, fly-ash, expanded mica and the like are used, but these take up to about 45 to 75% of the volume of the container or burial site, thus leaving a very small amount of volume for the liquid waste to be disposed of. Consequently, a large number of barrels or containers and a large volume burial site are necessary in disposing of liquid hazardous wastes which adds tremendously to the problems and expense of disposing of this waste.

Prior to disposal most liquid hazardous wastes are solidified by addition of a fixate that physically and chemically binds the waste. Some wastes are encapsulated. The processes reduce the ability of the waste to permeate through the site and provide structural strength for the disposal site. The common additivies for liquid wastes are portland cement, fly-ash, soluble silicates, cement kiln dust, lime, bitumen, paraffin, monomers or polymers, such as urea-formaldehyde, and thermoplastics, such as polyethylene.

The resulting solidified waste may not be as hazardous as the original liquid. If the physical or chemical properties have been sufficiently altered the resultant solidified waste may be disposed of in a less expensive or troublesome manner. A waste is classified as hazardous if it is reactive, toxic, ignitable, corrosive, or has other characteristics to cause harm. By containing and/or solidifying the liquid waste in a specific manner the resultant solid or semi-solid waste may be nonreactive, less corrosive, thermally stable over wide temperature ranges thus prohibiting ignition, or less toxic as determined by extraction of a leachate to be produced and analyzed in accordance with government agency regulations.

Motion of noxious liquids, such as sloshing, or an impulse or mechanical shock applied to hazardous liquids which are free to move about is extremely dangerous and results in undesirable fumes or explosions which makes it difficult to transport or contain such hazardous liquids. It would be highly desirable to minimize or eliminate the explosive hazard of volatile liquids or compositions and minimize or eliminate noxious fumes from waste liquids, especially during handling and transportation, or when spilled.

It would be further highly advantageous to contain liquids, such as reactive liquids that give off noxious fumes, so that fumes are suppressed thereby providing for a safe approach and reduced risk in handling or transporting these liquids.

It would also be highly advantageous to provide for the containing of hazardous materials in which hazardous materials are encapsulated.

It would be advantageous to provide for the containment of radioactive wastes in a manner that reduces accessibility during handling, or retards the absorption or spreading of the waste into the environment when spilled.

It would be advantageous to provide one material that is capable of treating almost all liquid wastes or chemicals and that is easy to transport and apply.

It would be advantageous to provide a material compatible with additives which eliminate specific hazards or which provide specific benefits during handling, transportation, containment, or disposal of hazardous wastes or chemicals. Additives which allow the resultant waste or chemical to qualify as non-hazardous are highly desirable.

It would be highly advantageous to provide a material that can contain a substantial amount of additive or waste or both, especially liquid, and will remain a free-flowing small particulate aggregate for mixing and pneumatic or spray applications or processes.

It would be highly advantageous to provide for the containment, removal, transportation, disposal or other handling of liquids in which the liquids are contained in the form of a solid or semisolid material, and can simply be removed, such as by shoveling, backhoes, and the like, as a solid or semisolid, rather than as a liquid, and further handled as a semi-solid or solid.

In the drilling of wells, such as oil and gas wells, drilling mud is used in the drilling operation and is circulated in the drill string and bore of the well from and back to a mud pit. Upon completion of the drilling operations, it is necessary to remove the mud from the pit and place the pit back into the condition the ground was in prior to digging the mud pit. This mud is presently removed from the pit in liquid form which is difficult and quite expensive and results in spillage of the liquid mud during transportation and problems in disposing of the liquid mud. It would be highly advantageous to contain the liquid mud as a solid or semi-solid for ease of removal of the mud from the pit, such as with a backhoe, transportation in solid or semi-solid form thereby avoiding spillage, and ease of disposal, all at greatly reduced costs. This also applies to acids, gels, fracturing agents, and the like, used to enhance production from wells.

SUMMARY OF THE INVENTION

The present invention is directed to containing and controlling in a solid or semi-solid form liquids, such as liquid wastes, hazardous liquid wastes, drilling muds, various chemicals, and the like, so that they can be removed, handled, transported and disposed of in such form rather than in liquid form thereby eliminating problems in removal, handling, transporting and disposal in liquid form.

The terms "solid" and "semi-solid" as used herein does not necessarily mean a change in state of the liquid to a solid, but rather the absorption or containment of the liquid by the solids in semi-solid or solid form or mass.

The containment of liquids is accomplished by adding biogenetic silica in a substantially amorphous state and having a porous skeletal structure, either alone or with additives, to the liquids in an amount sufficient to form a solid or semi-solid mass, and in the case of hazardous liquid wastes, by providing such a mass with no more than about 5% free-standing liquids, or the amount of free liquid permitted under governmental regulations. Presently, the preferred biogenetic silica is rice hull ash, although silica obtained from cell structure or plant species that are relatively high in biogenetic silica can be used either alone or in combination with rice hull ash. These include rice stalks, equisetum (horsetail weeds), certain bamboos and palm leaves, particularly palmyra pollen, and the like, all of which when burned, leave a porous ash that is highly desirable for containment of liquids.

A wide variety of additives can be combined with the biogenetic silica ash. These include water swellable, cross-linked polymers; carbon, such as activated charcoal; water soluble cement, such as portland cement, flu dust; various plastic monomers or polymers such as polyurethane; thermal plastics such as polyethylene or polypropylene, cellulosic polymers; inorganic salts, such as acids, bases, buffers, oxidizers; paraffins, bitumen, or waxes; gels such as sodium silicate, and the like. If desired, bactericides, fungicides and the like can be added.

The biogenetic silica ash, either alone or with additives, can be applied to the surface of the liquids in bulk or in contained form, such as in pellets. It can be simply added by gravity or it can be sprayed onto or into the liquids. For highly viscous liquids, it may be necessary for some mixing to contain all the liquids in semi-solid or solid form.

Advantageously, biogenetic silica ash, such as rice hull ash has a porous skeletal silica structure with approximately 75 to 80% open void spaces. Thus, a very small volume of this material will contain a relatively large volume of liquids. This is highly advantageous and particularly for disposing of or containing hazardous wastes in which not more than 5% free liquid is permitted in a barrel or container to be buried, transported, or stored, since this material would only take up to about 20 to 25% of the volume of the container in which the hazardous waste is being buried or contained, and a like portion of the volume of the burial site.

Accordingly, it is an object of the present invention to contain liquids in the form of solids or semi-solids for the purpose of removal, transportation, disposal or other handling.

It is yet a further object of the present invention to provide for the containment of liquids in solid or semi-solid form in which the motion of hazardous or noxious liquids is stabilized, thereby avoiding the creation of undesirable fumes and reducing explosion potential thereby resulting in ease of transportation or containment for such hazardous liquids.

A further object of the present invention is the provision of a method for the removal of drilling muds and other workover or production liquids from drilling pits by rendering the drilling muds or other liquids into a solid or semi-solid state so that they can be removed, transported, disposed of or otherwise handled as a solid or semi-solid thereby avoiding the attendant problems involved in the removal, transportation, disposal and handling of drilling muds in liquid form and at substantially reduced cost.

A further object of the present invention is the containment of liquids in semi-solid or solid form in which the containment is enhanced by additives.

A further object of the present invention is the provision of the containment of hazardous liquids in the form of solids or semi-solids in which the contained liquids are insulated uniformly thereby reducing the rate of vaporization or decomposition induced by applied heat, and thereby retarding the rate of combustion or eliminating the possibility of combustion of components of the liquid and its vapors.

A further object of the present invention is the provision of containment of radioactive liquids, such as radioactive waters, in a solid or semi-solid form so that they can be safely disposed of in containers, in landfills, at sea, and the like.

A further object of the present invention is the provision of the containment of liquids as solids or semi-solids so they can be handled, removed, transported and disposed of safely, expeditiously, and relatively inexpensively.

Other and further objects, features and advantages of the present invention appear throughout and are inherent therein.

PRIOR ART STATEMENT

Applicants are not aware of any art teaching the use of biogenetic silica in amorphous state with a porous skeleton, alone or in combination with additives, for the confinement of waste and hazardous liquids, drilling muds or chemicals in solid or semi-solid form, for the purposes set forth herein, except U.S. Pat. No. 4,238,374 discloses rice hull ash and a binder. Also, what is termed by the authors as a "universal gelling agent" comprising a combination of gelling agents in equal parts with fumed silica is disclosed in Proc. 1976 Nat. Conf. on Control of Hazardous Material Spills, 259, 260.

DESCRIPTION OF PRESENTLY PREFERRED EMBODIMENTS

As previously mentioned, the present invention is directed to confining liquids, such as liquid wastes, hazardous liquid wastes, drilling muds, chemicals, solvents and the like, in solid or semi-solid form. This is accomplished by adding directly to these liquids biogenetic silica in amorphous state with a porous skeletal structue, either alone or with additives, in an amount sufficient to hold the liquid in the form of a solid or semi-solid. The biogenetic silica with a porous skeleton in amorphous state, either alone or with an additive or additives, can be applied to the surface of the liquid, either in bulk or in pellets. For very heavy or viscous liquids, some stirring may be necessary and preferably the amount added should be sufficient so that there is no free-standing liquid. Advantageously, the liquid can then be removed, handled, transported, disposed of, and the like, as a solid or a semi-solid rather than as a liquid thereby avoiding or minimizing the problems, hazards, expense attendant to removing, handling, transporting and disposing of liquids.

The invention is applicable to liquid wastes, including hazardous wastes, such as radioactive liquids and the like, drilling muds and chemicals. The term "chemicals" as used herein include chemicals, such as oils, solvents, pesticides, industrial and household chemicals and preparations and the like. These may be adjusted by additives or diluted so as to mix with ash and be held by it.

The presently preferred biogenetic silica is rice hull ash. Rice hulls are high in silica content, containing about 18 to 22% by weight, with the ash having a porous skeletal silica structure having approximately 75 to 80% open or void spaces. In addition, it has been a continuing problem for the rice industry to dispose of rice hulls, and, while a number and variety of uses for rice hulls and rice hull ash have been proposed and used, large volumes of rice hulls are burned, and their ash is disposed of by the rice industry as a waste material at great expense.

While rice hull ash is preferred, other biogenetic silica sources can be used, such as ash from the cell structure of rice stalks, equisetum (horsetail weeds), certain bamboo palm leaves, particularly palmyra pollen and the like.

Biogenetic silica in amorphous state and in substantially porous form can be obtained either by burning or decomposition of the hulls.

Commercially available rice hull ash is prepared by burning rice hulls in a furnace. In the process, raw rice hulls are continually added to the top of the furnace and the ash is continuously removed from the bottom. Temperatures in the furnace range from 800° to about 1400° C., and the time factor for the ash in the furnace is about three minutes. Upon leaving the furnace, the ash is rapidly cooled to provide ease in handling. When treated by this method, the silica remains in a relatively pure amorphous state rather than the crystalline forms known as tridymite or crystobalite. This transition from the amorphous to the crystalline state generally takes place when the silica is held at very high temperatures, for example 2000° C., for longer periods of time. The significance of having the silica in an amorphous state is that the silica ash maintains a porous skeletal structure rather than migrating to form crystals, and the amorphous form of silica does not cause silicosis thus reducing cautionary handling procedures. The burning of the rice hulls is time-temperature related, and burning of these hulls under other conditions can be done so long as the ash is in an amorphous state with a porous skeletal structure.

The amount of open or void spaces in the biogenetic silica ash depends on the amount of fines in the ash. The inclusion of fines is not deleterious; however, the more porous the ash the better. It is highly porous, for example, rice hull ash has approximately 75 to 80% open or void spaces, so that air is trapped in these space which is thus displaced by the liquid being contained.

It is fire-retardant, inert, and is dimensionally stable at low and high temperatures, thus rendering it useful at elevated temperatures without structural change.

If desired, binders can be combined with the biogenetic silica ash, such as water-soluble polymers and any cross-linked polymers whose linear analog is water soluble. Amounts up to and more than 1 percent by weight are satisfactory. For a description of such binders combined with biogenetic silica ash, reference is made to U.S. Pat. No. 4,238,374. The presently preferred water soluble polymer binder is a starch acrylonitrite graft copolymer.

If desired, carbon can be added to the biogenetic silica ash in amounts up to 10% of the volume of the ash for purposes of selectively absorbing chemicals that may be contained in liquids to be absorbed in the ash. The carbon should be in small particles and may be obtained from several sources, such as carbon black, activated charcoal, or other materials which would provide carbon.

Pellets can be constructed by bagging the ash in a fibrous mesh such as nylon hosing or fiberglass cloth. For certain applications, such as solvent spill clean-up, it will be advantageous to use pellets or bags which have a thermoplastic such as polypropylene encasing the ash so that the release of the ash is controlled by the environment of the pellet or bag with respect to liquids which it contacts, temperature, and the like. In addition, such pellets or bags may be constructed so as to float upon certain liquids to provide a surface barrier to suppress fumes, selectively absorb chemicals, and aid in approaching and handling liquids particularly in accidental spills of hazardous chemicals.

The biogenetic silica will absorb by capillary action and retain the liquid due to the liquid's surface tension. The small particle size of the ash aids the distribution of the biogenetic silica upon or throughout the liquid thus enhancing both physical effects. The sorbent properties may be enhanced by additives such as the solidifying agents: hydroxyethyl cellulose for use with liquids containing sodium cyanide or sodium hydroxide or other chemicals; polyacrylonitrile butadiene copolymer for use with chemicals such as acetone cyanohydrin or other cyanohydrins, halogenated solvents, or acrylates such as methacrylic acid; polyacrylamide for use with acids such as oleum or chlorosulfonic acid or other chemicals; or polymethylmethacrylate for use on bromine spills, acids and other chemicals; polypropylene for use with organophosphates such as malathion, sulfur compounds such as carbon disulfide, halogenated compounds such as chlorobenzene, acetyl chloride, or polychlorinated biphenyls, or nitrogen compounds such as acrylonitrile, diethylamine, or nitrobenzene; polyurethane for use with chemicals such as cyanogen chloride, styrene, phenol, vinyl acetate, amyl acetate, or butyl acetate; cross-linked polymers for use with chemicals such as chloroform, ethylbenzene, or xylene; gelling agents such as sodium silicate or potassium silicate for use with chemicals containing sulfur such as methyl mercaptan, acids such as formic and acetic, or others; polyolefins for use with isoprene, acetates, or others; and minerals such as calcium carbonate or bentonite clays.

Mixtures of additives may be used to provide multipurpose or universal containment of a variety of liquids, both inorganic and organic. An example of such a mixture is set forth in Example 4 herein.

Biogenetic silica is sufficiently porous with a specific gravity of about 15–20 pounds per cubic foot, such that dry biogenetic silica ash will absorb from 2 to 4 times its weight of a variety of common liquids. Advantageously, there are no special mixing requirements unless the liquids are so thick that they do not flow. Thus, the biogenetic silica ash can be applied directly on top of the liquid, such as in liquid spills, or mud pits to promote containment as a solid or semi-solid, or placed into containers in which the liquids are placed.

The following example illustrates the confining or containment capabilities of a variety of liquids in semi-solid or solid form by rice hull ash alone and rice hull ash containing 1% by weight of a hydrolized starch-acrylonitrite graft copolymer.

EXAMPLE 1

The following procedures were used in this example.

1. Approximately 15 grams of a liquid to be absorbed was weighed in a small plastic container.
2. The dry biogenetic silica ash (BS) or biogenetic silica ash with copolymer (BSC) was slowly added onto the liquid until no free liquid was observed.
3. The mixture was then gently mixed with a spatula to see if additional dry material was needed for free liquid.
4. After no free liquid remained, the mixture was again weighed and the amount of biogenetic silica ash (BS) alone and with the copolymer (BSC) was determined. The following Table I shows the amount by weight of the various liquids absorbed.

TABLE I

AMOUNT OF ABSORBENT REQUIRED TO EFFECTIVELY SOLIDIFY ALL FREE STANDING LIQUID

| Liquid Material | Grams Weight | Dry Material | Grams Weight |
|---|---|---|---|
| Glycerine | 20 | BS | 6 |
| Glycerine | 18 | BSC | 4.5 |
| Methyl Ethyl Ketone | 18 | BS | 9 |
| Methyl Ethyl Ketone | 18 | BSC | 8 |
| Mineral Oil | 14.5 | BS | 6 |
| Mineral Oil | 14 | BSC | 5.5 |
| Antifreeze (Glycol) | 16 | BS | 4 |
| Antifreeze (Glycol) | 13 | BSC | 3.5 |
| Chlordane | 10 | BS | 2.5 |
| Chlordane | 10.5 | BSC | 2.5 |
| Castor Oil | 15 | BS | 6 |
| Castor Oil | 14 | BSC | 5.5 |
| Sevin Insecticide (24%) | 12 | BS | 3 |
| Sevin Insecticide (24%) | 11.5 | BSC | 3 |
| Chlorox | 14 | BS | 5 |
| Chlorox | 14 | BSC | 4.5 |
| Crude Oil (West Texas) | 15 | BS | 6 |
| Crude Oil (West Texas) | 14 | BSC | 5 |
| Refined Oil (Quaker State 30 Wt.) | 14 | BS | 5 |
| Refined Oil (Quaker State 30 Wt.) | 15 | BSC | 5 |
| | 15 | BSC | 5 |

The following Table II sets forth the percent by weight of rice hull ash alone and with the one percent by weight copolymer required to contain the various liquid materials of Table I in a solid or semi-solid form without any free liquid.

TABLE II

PERCENT BY WEIGHT OF BIOGENETIC SILICA AND MODIFIED BIOGENETIC SILICA REQUIRED TO SOLIDIFY VARIOUS LIQUID MATERIALS

| Liquid Materials | Wt. % BS Added For Effective Solidification | Wt. % BSC Added For Effective Solidification |
|---|---|---|
| Glycerine | 30 | 25 |
| Methyl Ethyl Ketone | 50 | 44 |
| Mineral Oil | 41 | 39 |
| Dowtherm Antifreeze | 25 | 26 |
| Chlordane (25% active) | 25 | 24 |
| Castor Oil | 40 | 39 |
| Sevin Insecticide | 25 | 26 |
| Chlorox | 36 | 32 |
| Crude Oil (West Texas) | 40 | 36 |
| Refined Oil (Quaker State 30 Wt.) | 36 | 33 |

From the foregoing Table II it is seen that a relatively small amount of either biogenetic silica (rice hull ash) alone or combined with one percent by weight of copolymer is required to contain these liquids in a solid or semi-solid state so that they can be readily removed, handled, transported, disposed of and the like in that form. Modifying the rice hull ash with one percent by weight of a starch acrylonitrile graft copolymer only slightly increased the absorption qualities as far as capacity was concerned; however, there were noticeable differences concerning the surface characteristics of the liquid contained as solids or semi-solids as follows:

(1) There was a noticeable drier surface appearance.

(2) When highly volatile solvents were absorbed, there was less odor, thus the vapor pressure was reduced.

(3) Methyl ethyl ketone without ash dissolved the bottom of the plastic container used to contain it in about 15 minutes. In using rice hull ash alone as the absorbent, the bottom of the container was partially dissolved in about 2 hours. In using rice hull ash with one percent by weight copolymer there was an initial attack on the container bottom, but after some apparent surface evaporation of the liquid, there was no further attack on the container and it remained intact.

In addition, modifying the biogenetic silica with a polymer apparently reduces the transport problems of absorbed liquids. Thus, after initial surface drying, the liquids are held in place with little or no migration to the surface. This is important when disposing of waste liquids that have the potential to damage a container, such as a metal drum, plastic container and the like.

EXAMPLE 2

In this example other biogenetic silica was substituted for rice hull ash with and without the copolymer. The same procedures were followed as in Example 1, and the results were substantially the same as those set forth in Tables I and II. These were ash from rice stalks, equisetum (horsetail weeds), bamboo and palm leaves.

EXAMPLE 3

In this example drilling mud was contained by the use of biogenetic silica (rice hull ash) alone and with about one percent by weight of the copolymer of Example I. The dry compositions were blown into the mud pit and it was found that one truck load, 1400 cubic feet, of rice hull ash alone or rice hull ash with one percent by weight copolymer, would contain about 215 barrels of 8 to 9 pound mud and 600 barrels of 18 pound mud, either oil based or water based, in a semi-solid or solid form so that the drilling mud could be handled as a solid; that is, it could be shoveled or scooped out of the mud pit as a solid with backhoes, loaded into trucks, transported and disposed of without danger of any liquid leakage thus avoiding contamination of the environment. The biogenetic silica alone or combined with the copolymer, can be dumped or blown onto the surface of the mud pit and with a minimal amount of mixing can be scooped up out of the mud pit and transported and disposed of as a solid or semi-solid.

EXAMPLE 4

This is an example of a mixture or blend of additives having properties when combined with biogenetic silica in amorphous state with a porous skeletal structure, such as rice hulls, which contains a broad range of organic and inorganic liquids in semisolid or solid form for easy and ready handling and disposal.

A blend of commercially available gelling agents was made having the following composition:
- 25% SGP hydrolyzed starch-acrylonitrile copolymer-General Mills
- 25% Imbiber beads-Dow Chemical Corporation
- 25% Hycar 1422-B. F. Goodrich Corporation
- 25% Carbopol 934-B. F. Goodrich Corporation The SGP gels aqueous liquids, the Imbiber beads immobilize inert spirits-type liquids, the Hycar 1422 works with polar organic chemicals including chlorinated hydrocarbons, and the Carbopol 934 stabilizes alcoholic liquids.

The blend was prepared by mechanical mixing. This blend was then added to biogenetic silica made from burning rice hulls. The final mixture by weight was:
- 97% biogenetic silica (rice hull ash)
- 3% gelling agent blend.

This new blend was then tested for its ability to form an immobile gel or semisolid mixture with a variety of liquids. It was found that the mixture would immobilize as a gel or semisolid approximately 3 to 4 times its weight of the following liquids:

TABLE III

| | | |
|---|---|---|
| Acetone | Acrylonitrile | Ammonium hydroxide |
| Arilene | Benzene | Butanol |
| Carbon Tetrachloride | Chloroform | Cyclohexane |
| Ethanol | Ethylene Glycol | Gasoline |
| Kerosene | Petroleum Ether | Pyridine |
| Sulfuric Acid | Tetrahydrofuran | Trichloroethylene |
| Water | | |

The Imbiber beads component is a loosely cross-linked copolymer of the class typified by polytertiary-butylstyrene copolymerized with divinylbenzene. Hycar 1422 is a material of the polycarylonitrile-butadiene copolymer class. Carbopol 934 is a methylcellulose polymer.

The amounts of the components can be varied to adapt to various uses; however, as set forth in the above Table III, a wide variety of liquids are contained in solid or semisolid form with equal amounts of the gelling agent blended with large amounts of the porous biogenetic silica for convenient handling and disposal. While 3% by weight of the components are used, this can vary from 0% up to 8% by weight. Also, one or mixtures of two or more of these agents can be used for various applications depending on the liquid to be contained and the properties of the component or components suitable for the particular liquid, as set forth above.

EXAMPLE 5

In this example, the compositions of Examples 1-4 were added in pellet form to the liquids set forth in these examples with substantially similar results. The pellets were formed by placing the biogenetic silica in amorphous state and with a porous skeleton alone or combined with additives into mesh type polypropylene bags holding approximately a quart of material.

From the foregoing it is apparent that the biogenetic silica in amorphous state with a skeletal structure, such as rice hull ash, alone and with the other additives, has excellent physical properties and is essentially inert chemically, resulting in a surprisingly efficient absorbent material. With the addition of a swellable polymer, the material not only absorbs an inordinate amount of various liquids, but holds the liquids in place, unless physically removed by compression or other means. In addition, the other additives coact with the biogenetic silica to provide the advantageous properties set forth. Therefore, in disposing of liquid waste, particularly problem wastes that are to be buried in landfills, biogenetic silica in amorphous form with a skeletal structure alone and with additives is far superior to commonly used absorbents such as sand, fly-ash or expanded mica. A single drum of waste in solid or semi-solid form with biogenetic silica alone or with a water swellable polymer holds about twice as much liquid as those using other absorbents thereby substantially reducing the cost of disposing of these liquids and substantially reducing landfill space.

In addition, the use of biogenetic silica alone or with an additive, substantially decreases the cost of removing, transporting, disposing of or otherwise handling of large volumes of drilling muds by converting them into solid or semi-solid masses rather than having to deal with them as a liquid with all the problems attendant to removal, handling, transporting and disposing of them as liquids.

The present invention therefore is well suited and adapted to attain the objects and ends and has the advantages and features mentioned as well as others inherent therein.

While presently preferred embodiments of the invention have been given for the purposes of disclosure, changes and equivalents therein and additional applications will suggest themselves to those skilled in the various arts to which the invention is directed as defined by the scope of the appended claims.

What is claimed is:

1. A method of containing a liquid selected from the group consisting of waste liquids, hazardous liquids, drilling muds, and chemicals, comprising,
   absorbing the liquid in biogenetic silica in amorphous state having a porous skeletal structure,
   a major portion of the liquid being contained in void spaces of the porous skeleton,
   the biogenetic silica being present in an amount sufficient to contain the liquid in at least a semisolid mass.

2. The method of claim 1 where,
   a water swellable polymer is combined with the biogenetic silica in an amount sufficient to gel the liquid within the void spaces.

3. The method of claim 2 where,
   the biogenetic silica is rice hull ash.

4. The method of claim 2 including,
   mixing the biogenetic silica and the water swellable polymer with the liquid.

5. The method of claim 2 where,
   the biogenetic silica and water swellable polymer are added to the liquid in pellet form.

6. The method of claim 1 where,
   the biogenetic silica is rice hull ash.

7. The method of claim 1 including,
   mixing the biogenetic silica with the liquid.

8. The method of claim 1 where,
   the biogenetic silica is added to the liquid in pellet form.

9. A method of containing a liquid selected from the group consisting of waste liquids, hazardous liquids, drilling muds and chemicals comprising,
   containing the liquid in biogenetic silica in amorphous state having a porous skeletal structure, a major portion of the liquid being contained in void spaces of the porous skeleton, the biogenetic silica being present in an amount sufficient to contain the liquid in at least a semisolid mass, and holding the contained liquids in the void spaces with an additive selected from the group consisting of carbon, water soluble cement, plastic polymer, inorganic salt, paraffin, wax, solidifying agents and gels.

10. The method of claim 9 where, the biogenetic silica and additive are in pellet form.

11. The method of claim 9 where the additive includes, a water swellable polymer.

12. The method of claim 11 including, adding a water swellable polymer to the mud along with the biogenetic silica.

13. A method of containing mud or sludge in a pit comprising, adding biogenetic silica in amorphous state and having a porous skeleton to the mud or sludge in the pit effective to contain a major portion of the mud or sludge in void spaces of the porous skeleton, the biogenetic silica being present in an amount to contain the liquid in at least a semisolid condition.

14. The method of claim 12 where, the biogenetic silica is rice hull ash.

15. The method of claim 13 including, adding a water swellable polymer with the rice hull ash to the mud.

16. A method of removing mud or sludge from a pit comprising, adding a quantity of biogenetic silica in amorphous state and having a substantially porous skeleton to the mud or sludge in the pit effective to contain a major portion of the mud or sludge in void spaces of the porous skeleton, the biogenetic silica being present in an amount sufficient to contain the mud or sludge in at least a semisolid condition, removing the mud from the pit in said condition, and transporting and disposing of the mud in said condition.

17. The method of claim 16 including, adding a water swellable polymer with the biogenetic silica to the mud.

18. The method of claim 17 including, adding a water swellable polymer along with the the biogenetic silica to the mud.

19. The method of claim 16 where, the biogenetic silica is rice hull ash.

20. The method of claim 18 including, adding a water swellable polymer with the rice hull ash to the mud.

21. A method of disposing of a liquid selected from the group consisting of waste liquids, hazardous liquids, drilling muds, and chemicals comprising, absorbing the liquid in biogenetic silica in amorphous state having a porous skeletal structure, a major portion of the liquid being contained in void spaces of the porous skeleton, the biogenetic silica being present in an amount sufficient to contain the liquid in at least a semisolid condition, and placing the liquid in said condition in a disposal site.

22. The method of claim 21 including, absorbing the liquid with the biogenetic silica and an additive selected from the group consisting of water swellable polymers, carbon, soluble cement, plastic polymer, inorganic salt, paraffin, wax, solidifying agents and gels, the additive attracting the liquid to and holding the major portion of the liquid in the void spaces.

23. A method of disposing of a hazardous liquid selected from the group consisting of waste liquids, hazardous liquids, drilling muds and chemicals comprising, containing the liquid in a container in at least a semisolid form absorbed by biogenetic silica in amorphous state with a porous skeleton, a major portion of the liquid being contained in void spaces of the skeletal structure, the biogenetic silica being present in sufficient quantity to confine the liquid in at least the semisolid form.

24. The method of claim 23 where, there is less than 5% by weight free liquid in the container.

25. A method of containing a liquid spill comprising, adding to the liquid biogenetic silica in amorphous state with a porous skeletal structure in an amount sufficient to absorb the liquid by the biogenetic silica in at least a semisolid mass, a major portion of the liquid being contained in void spaces of the biogenetic silica.

26. The method of claim 25 including, removing the mass.

27. A method of containing a liquid selected from the group consisting of waste liquids, hazardous liquids, drilling muds and chemicals comprising, absorbing the liquid with biogenetic silica in amorphous state having a porous skeletal structure, a major portion of the liquid being contained in void spaces of the porous structure, the biogenetic silica being combined with at least one additive selected from the group consisting of a water swellable polymer, loosely crosslinked copolymer of the class typified by polytertiarybutylstyrene copolymerized with divinylbenzene, polycarylonitrilebutadiene copolymer, polycarboxymethylcellulose polymers, and mixtures thereof.

28. The method of claim 27 where, the biogenetic silica is rice hull ash.

* * * * *

UNITED STATES PATENT OFFICE
CERTIFICATE OF CORRECTION

Patent No. 4,460,292                    Dated   July 17, 1984

Inventor(s)   Robert L. Durham, et al.

It is certified that error appears in the above-identified patent and that said Letters Patent are hereby corrected as shown below:

Column 1, line 21, before "into" insert --liner--.

Column 3, line 7, change "does" to --do--.

Column 4, line 57, change "structue" to --structure--.

Column 5, line 6, change "include" to --includes--.

Column 5, line 24, after "bamboo" insert -- , --.

Column 7, the last four lines of Table I should read:

| Refined Oil (Quaker State 30 Wt.) | 14 | BS | 5 |
| Refined Oil (Quaker State 30 Wt.) | 15 | BSC | 5 |

Signed and Sealed this

*Nineteenth* Day of *February 1985*

[SEAL]

*Attest:*

DONALD J. QUIGG

*Attesting Officer*     *Acting Commissioner of Patents and Trademarks*